United States Patent
Heaton et al.

(10) Patent No.: US 9,347,687 B2
(45) Date of Patent: May 24, 2016

(54) SOLAR COLLECTOR, SYSTEM, AND METHOD OF USE

(71) Applicants: Ronald D. Heaton, North Vernon, IN (US); Justin J. Lawrence, North Vernon, IN (US)

(72) Inventors: Ronald D. Heaton, North Vernon, IN (US); Justin J. Lawrence, North Vernon, IN (US)

(*) Notice: Subject to any disclaimer, the term of this patent is extended or adjusted under 35 U.S.C. 154(b) by 358 days.

(21) Appl. No.: 13/804,670

(22) Filed: Mar. 14, 2013

(65) Prior Publication Data
US 2013/0255668 A1    Oct. 3, 2013

Related U.S. Application Data

(60) Provisional application No. 61/618,742, filed on Mar. 31, 2012.

(51) Int. Cl.
| | |
|---|---|
| *F24J 2/50* | (2006.01) |
| *F24J 2/24* | (2006.01) |
| *F24J 2/48* | (2006.01) |
| *F24J 2/28* | (2006.01) |
| *F24J 2/30* | (2006.01) |
| *F24J 2/36* | (2006.01) |

(52) U.S. Cl.
CPC *F24J 2/244* (2013.01); *F24J 2/243* (2013.01); *F24J 2/28* (2013.01); *F24J 2/30* (2013.01); *F24J 2/36* (2013.01); *F24J 2/482* (2013.01); *F24J 2/506* (2013.01); *Y02B 10/20* (2013.01); *Y02E 10/44* (2013.01)

(58) Field of Classification Search
CPC ............ F24J 2/36; F24J 2/208; F24J 2/4647; F24J 2/243; F24J 2/201; F24J 2/506; Y02E 10/40
USPC .................................................. 126/624, 625
See application file for complete search history.

(56) References Cited

U.S. PATENT DOCUMENTS

| | | | | |
|---|---|---|---|---|
| 4,008,708 A | * | 2/1977 | Hagarty ........................ | 126/668 |
| 4,026,268 A | * | 5/1977 | Bartos et al. .................. | 126/626 |
| 4,059,095 A | * | 11/1977 | Grundmann et al. ......... | 126/624 |
| 4,062,346 A | * | 12/1977 | Rapp et al. .................... | 126/649 |
| 4,151,830 A | * | 5/1979 | Crombie et al. ............... | 126/624 |
| 4,160,443 A | * | 7/1979 | Brindle et al. ................ | 126/625 |
| 4,182,307 A | * | 1/1980 | Brindle et al. ................ | 126/625 |
| 4,203,420 A | * | 5/1980 | Schoenfelder ................ | 126/625 |
| 4,258,697 A | * | 3/1981 | Flagg ............................ | 126/596 |
| 4,287,876 A | * | 9/1981 | Jacques ......................... | 126/624 |
| 4,287,883 A | * | 9/1981 | Kyrias .......................... | 126/669 |

(Continued)

*Primary Examiner* — Jorge Pereiro
(74) *Attorney, Agent, or Firm* — Roberts IP Law; John Roberts

(57) ABSTRACT

Provided is a light-weight, easy to install, use and remove solar collector that may be manufactured inexpensively from readily available common materials, and which may be installed, removed, moved, and reinstalled almost anywhere by almost anyone without special tools or skills. In one embodiment, the solar collector comprises one or more collection tubes formed from attaching clear or substantially translucent material, such as clear vinyl, along the edges and over the top of dark colored or otherwise solar-energy-absorbant material, such as black polyethylene plastic, black vinyl-coated polyester, or any other suitable material, which may be insulated by an insulative layer. A dark-colored or otherwise solar-energy-absorbant air-permeable layer may also be located in the collection tube to increase heating of the air flowing through the collection tube. In addition to the solar collector is a fan, which may take the form of a forced-air window unit with thermostatic controls.

20 Claims, 9 Drawing Sheets

(56) References Cited

U.S. PATENT DOCUMENTS

| | | | |
|---|---|---|---|
| 4,296,732 A * | 10/1981 | Bernhardt et al. | 126/624 |
| 4,372,291 A * | 2/1983 | Schwartz | 126/655 |
| 4,404,958 A * | 9/1983 | Boettcher | 126/625 |
| 4,465,058 A * | 8/1984 | Reick | 126/628 |
| 4,471,759 A * | 9/1984 | Anderson et al. | 126/626 |
| 4,524,757 A * | 6/1985 | Buckley | 126/624 |
| 4,731,072 A * | 3/1988 | Aid | 604/408 |
| 5,388,567 A * | 2/1995 | Hodak | 126/626 |
| 5,893,360 A * | 4/1999 | Stoumen et al. | 126/714 |
| 6,827,128 B2 * | 12/2004 | Philpott et al. | 165/46 |
| 2003/0131842 A1 * | 7/2003 | Doll | 126/651 |
| 2004/0050532 A1 * | 3/2004 | Yamaguchi et al. | 165/46 |
| 2004/0060555 A1 * | 4/2004 | Keiser et al. | 126/624 |
| 2008/0017499 A1 * | 1/2008 | Brockhoff | 203/11 |
| 2008/0202498 A1 * | 8/2008 | Ramos | 126/626 |
| 2008/0311392 A1 * | 12/2008 | Tsu | A01G 9/1438 428/336 |
| 2010/0101562 A1 * | 4/2010 | Pellegrino | 126/625 |

* cited by examiner

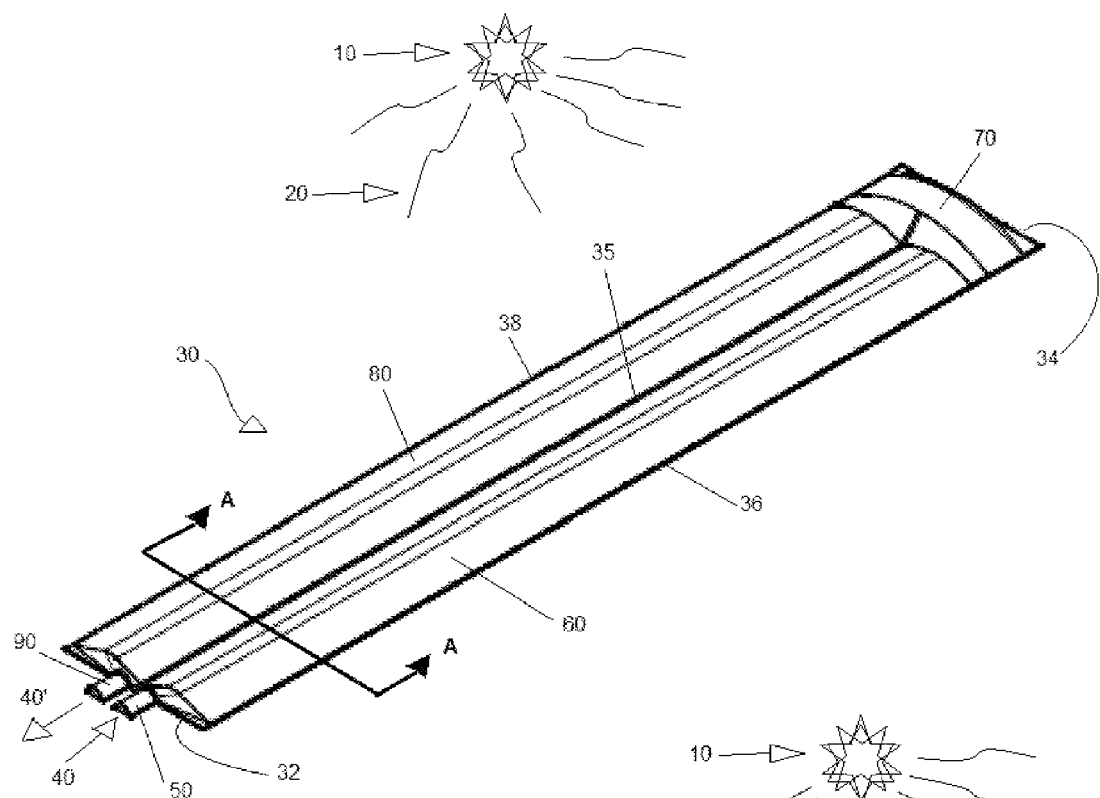
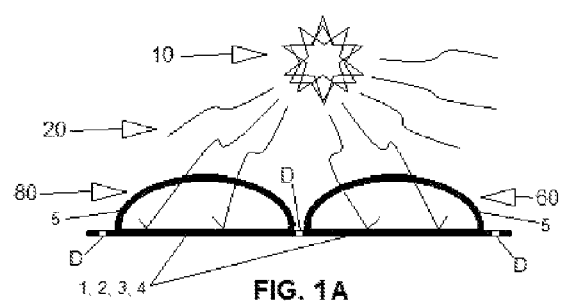

SOLAR COLLECTOR, SYSTEM, AND METHOD OF USE

CROSS-REFERENCE TO RELATED APPLICATIONS

This application claims the benefit of and incorporates herein by reference, U.S. provisional patent application No. 61/618,742, which was filed on Mar. 31, 2012 on behalf of Gasper et al.

FEDERALLY SPONSORED RESEARCH OR DEVELOPMENT

None.

TECHNICAL FIELD

The present invention relates to solar collectors, systems and methods.

BACKGROUND

The desirability of collecting energy from the sun is well known. However, most homes, businesses and other buildings still do not take advantage of the free heating energy available from the sun. This is due primarily to the high cost associated with present solar systems, which is driven by their complexity in construction and installation, as well as their use of expensive materials and manufacturing techniques.

What is needed is an effective but inexpensive solar collector that may be easily and inexpensively integrated into a heating system. What is especially needed is a solar collector, system, and method of use that is sufficiently inexpensive and easy to install, use, and remove that homeowners, business owners, and even renters could feasibly adopt the technology on a wide scale without government subsidies. Such a technical breakthrough could reduce the burning of fossil fuels that release carbon dioxide and other pollutants into the atmosphere, reduce demand for foreign oil and thereby lower fuel prices, reduce mining and drilling in sensitive habitats, and slow the need for new powerplants of all types, along with their attendant power lines, infrastructure, and financial and environmental costs.

SUMMARY

The present invention achieves all these goals and more by providing a light-weight, easy to install, use and remove solar collector that may be manufactured inexpensively from readily available common materials, and which may be installed, removed, moved, and reinstalled almost anywhere by, almost anyone without special tools or skills. In one embodiment, the solar collector comprises one or more collection tubes formed from attaching clear or substantially translucent material, such as clear vinyl, along the edges and over the top of dark colored or otherwise solar-energy-absorbant material, such as black polyethylene plastic, black vinyl-coated polyester, or any other suitable solar-energy-absorbent material. Air is then blown into the collection tube, for instance with a fan, which at least partially inflates the collection tube, and causes air to flow from a first end of the collection tube to a second end of the collection tube. Solar radiation impinges on and travels through the clear or substantially translucent material, into the collection tube, and is at least partially absorbed by the solar-energy-absorbent material, thereby heating and raising the temperature of the solar-energy-absorbent material. Air flowing through the collection tube is heated by passing next to and along the solar-heated energy-absorbent material from the first end of the collection tube to the second end of the collection tube. In certain example embodiments, a junction is located at the second end of the collection tube, and the junction joins the second end of the first collection tube to a first end of a second collection tube. In those embodiments, the air flow continues through the second collection tube from the first end to the second end, continuing to be heated as described above. For convenience of installation, the second end of the second collection tube may be located near the first end of the first collection tube; i.e., the intake and exhaust of the system may be located next to or near each other for easy integration with an existing heating system or with a stand-alone heating system adapted for use with the present solar collector. Additional junctions leading to additional collection tubes may be provided in various embodiments, thereby increasing the size and heat-generating capacity of the system. The clear or substantially translucent material may be attached to the solar-energy-absorbent material by any suitable means, such as sonic or heat welding, chemical or mechanical bonding, or any other inexpensive and simple air-tight means. Through holes may be provided in the seams along the edges of the collection tubes for use as attachment means to attach the collector to a surface, such as the ground. Through holes may also be provided in the seams between the collection tubes to allow rainwater to drain out from between the collection tubes.

To increase the efficiency of the solar collector and the system of which it is a part, the dark-colored or otherwise solar-energy-absorbant material may be placed on top of an insulating layer to limit heat loss to the surrounding environment. For example, in certain example embodiments there are two layers of dark-colored or otherwise solar-energy-absorbent material separated by an insulating layer, such as compact, durable, and flexible radiant-reflective insulation. One brand of such insulation is known by the brand name Prodex and is commonly available nationwide.

To further increase the efficiency of the solar collector and the system of which it is a part, it has been found that the addition of a dark-colored or otherwise solar-energy-absorbant air-permeable layer into the collection tube increases heating of the air flowing through the collection tube. For example, in certain example embodiments a layer of black plastic or fiberglass screen material is laid on top of the top layer of dark-colored or otherwise solar-energy-absorbant material, before the clear or substantially translucent material is affixed to the top. It is believed that this additional layer of dark-colored air-permeable material increases the collection, and retention of solar energy inside collection tube, and also provides boundary-layer turbulence to increase the transfer of heat to the air flowing through the collection tube.

A stand-alone heating control system is also provided that is adapted to work with the present solar collector. In various example embodiments the heating control system may include a housing having an air input from the solar collector and an air output to the solar collector, an air output register that directs the flow of heated air from the system into the room or space where the heating control system is placed, and an air return register that directs the flow of air from the room or space where the heating control system is placed back into the solar collector. A powered fan or other source of pressurized air that may be located within the housing forces air from the air return into the solar collector and pressurizes and at least partially inflates the solar collector and causes the air to flow through the solar collector. The stand-alone heating control system may include a thermostat and other electronics that control the fan, for instance to turn the system on and off at certain predetermined ambient temperatures that may be set by a user. The stand-alone heating control system may be adapted and sized to lit into a typical window of a home, and thus become a "window unit" heater, analogous to a window-unit airconditioner. Air duct hoses may be provided that connect the output of the solar collector to the input of the heating control system, and that connect the output of the heating control system to the input of solar collector. The air duct hoses may be insulated.

A typical example solar collector made according to the invention might comprise two or more adjacent collection tubes joined by a junction, together covering an area of about, for example, four feet by about 24 feet. Such a unit can be rolled up into a cylinder about 18 inches in diameter and weighing only about 35 to 50 pounds. A simple installation of such a unit on the ground will take under an hour. Such a unit could also be mounted on roofs and sides of buildings with very minor preparation. In addition to the solar collector is a fan or other source of pressurized air, which may take the form of a forced-air window unit. A typical example forced-air window unit may include a 150 CFM to 500 CFM fan (though any other suitable flow rate may be used) with temperature controls to turn the fan on and off based on the temperature in the collector and the temperature inside the structure receiving the heat. This type of system with these example dimensions is believed to generate about 12000 to 15000 BTU's in full Winter sunlight in the Midwestern United States when it is only about 30 degrees Fahrenheit outside. Finally, in view of the simple construction and common materials used, complete systems such as the one described above could be made and sold for just a few hundred dollars, and installed by end users at no additional cost.

Accordingly, provided in various example embodiments is a flexible, inflatable, longitudinally extending solar collector that is substantially flat and readily capable of being compressed to less than ten millimeters thick when uninflated, comprising: a first layer formed of flexible, tear-resistant, substantially air-tight and waterproof plastic; a second layer on top of and substantially covering the first layer and comprising flexible insulative material adapted to reflect radiant energy; a third layer on top of and substantially covering the second layer and comprising flexible material adapted to absorb solar energy; a fourth layer on top of and substantially covering the third layer and comprising flexible material adapted to absorb solar energy, the fourth layer being air-permeable; a fifth layer on top of and substantially covering the first, second, third, and fourth layers and comprising flexible, tear-resistant, substantially air-tight and waterproof plastic material adapted to be substantially translucent to solar radiation; wherein at least the first and fifth layers are affixed together by a plurality of longitudinally extending seams forming there between a substantially air-tight heating chamber below the fifth layer, the substantially air-tight heating chamber comprising at least one of an air intake port, an air exhaust port, or one or more junctions adapted to be in air communication with another heating chamber in another solar collector; and wherein the solar collector is adapted to heat pressurized air when it is passed into the air intake port, through the heating chamber below the fifth layer, and out the air, exhaust port or junction, when the solar collector is placed in sunlight with the fifth layer facing the sun.

In various example embodiments of the solar collector, at least the first and fifth layers may be affixed together by a plurality of longitudinally extending seams forming there between a plurality of substantially air-tight heating chambers below the fifth layer, the substantially air-tight heating chambers in air communication with each other through a junction; wherein the solar collector is adapted to heat pressurized air when it is passed into the air intake port, through a first heating chamber below the fifth layer, through a junction, through a second heating chamber below the fifth layer, and out the air exhaust port, when the solar collector is placed in sunlight with the fifth layer facing the sun.

Various example embodiments of the solar collector may further comprise a sixth layer on top of and substantially covering the fifth layer and comprising flexible, tear-resistant, substantially air-tight and waterproof plastic material adapted to be substantially translucent to solar radiation; wherein the fifth and sixth layers are affixed together by a plurality of longitudinally extending seams forming there between a substantially air-tight insulating chamber between the fifth and sixth layers. In various example embodiments, the first layer may comprise black polyethylene plastic and/or black vinyl-coated polyester, the second layer may comprise reflective aluminum foil on each side of a closed-cell polyethylene foam center, the third layer may comprise black polyethylene plastic and/or black vinyl-coated polyester, the fourth layer may comprise a perforated material having an unsmooth surface adapted to generate boundary layer turbulence in air moving across the surface, such as black fiberglass screen material, and the fifth layer may comprise clear vinyl. At, least a portion of the longitudinally extending seams may be at least one of the following: sonically welded; heat welded; chemically bonded; mechanically bonded; and/or sewn.

In various example embodiments the solar collector may be connected with a plurality of similar solar collectors wherein the air exhaust port of a first solar collector is in air communication with the air intake port of a second solar collector. Alternatively or additionally, the air exhaust port of a first solar collector is not in air communication with the air intake port of a second solar collector, but the air intake ports of the first and second solar collectors are in air communication with each other and the air exhaust ports of the first and second solar collectors are in air communication with each other.

Also provided in various example embodiments is a solar collector system, comprising: a solar collector as described above; a heating control system comprising a housing defining one or more air inputs in communication with one or more hot air registers, and one or more cool air return registers in air communication with an air pressurizer, the air pressurizer in pressurized air communication with one or more air outputs; first ducting adapted to connect at least one of the air outputs of the heating control system to the air intake port of the solar collector; and second ducting adapted to connect the air exhaust port of the solar collector to at least one of the air inputs of the heating control system; wherein the solar collector system is adapted to cause air to flow into the cool air return register, be pressurized by the air pressurizer, flow out at least one of the air outputs, through the first ducting, into the intake port of the solar collector, through the heating chamber in the solar collector, thereby inflating it, out the air exhaust port of the solar collector, through the second ducting, into at least one of the air inputs, and out of at least one of the hot air registers. The heating control system housing may be adapted to be removably lodged in the at least partially open window of a building such that the one or more hot air registers and one or more cool air return registers are directed toward the interior of the building, and the one or more air inputs and one or more air outputs are directed outside the building. The air pressurizer may be controlled by one or more thermostats that monitor the temperature of the air being delivered to the heating control system from inside the building and the temperature of the air being delivered to the heating control system by the solar collector. The ducting may comprise flexible duct hose in various embodiments.

Provided in various example embodiments is a method of using a solar collector system, comprising the steps of: providing a solar collector system as described above; removably lodging the housing of the heating control system into an at least partially open window of a building such that the one or more hot air registers and one or more cool air return registers are directed toward the interior of the building, and the one or more air inputs and one or more air outputs are directed outside the building; placing the solar collector in sunlight with the fifth layer facing the sun; connecting at least one of the air outputs of the heating control system to the air intake port of the solar collector with the first ducting; connecting the air exhaust port of the solar collector to at least one of the air inputs of the heating control system with the second ducting; and causing air to flow into the cool air return register, be pressurized by the air pressurizer, flow out at least one of the air outputs, through the first ducting, into the intake port of the solar collector, through the heating chamber in the solar collector, thereby inflating it, out the air exhaust port of the solar collector, through the second ducting, into at least one of the air inputs, and out of at least one of the hot air registers. The method may further comprise the steps of: disconnecting the first and second ducting from the solar collector; deflating the solar collector; rolling the solar collector into a coil; and picking up and moving the coiled solar collector with one's arms.

Many other aspects of the invention are disclosed herein as discussed in the following Figures and Detailed Description.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views. It will be understood that certain components and details may not appear in the figures to assist in more clearly describing the invention.

FIG. 1 is a top isometric view of a first example solar collector according to various example embodiments.

FIG. 1A is a sectional view of the example solar collector of FIG. 1 through section line A-A.

FIG. 3 is a top plan view of the example solar collector of FIG. 1.

FIG. 4 is a close-up view of the indicated portion of FIG. 3, showing through holes according to various example embodiments.

FIG. 5 is a bottom isometric view of an example stand-alone heating control system according to various example embodiments.

FIG. 6 is a top perspective view of an insulation layer according to various example embodiments.

FIG. 7 is a top perspective view of an example solar collector according to various example embodiments, in a non-inflated condition.

Figure 2:
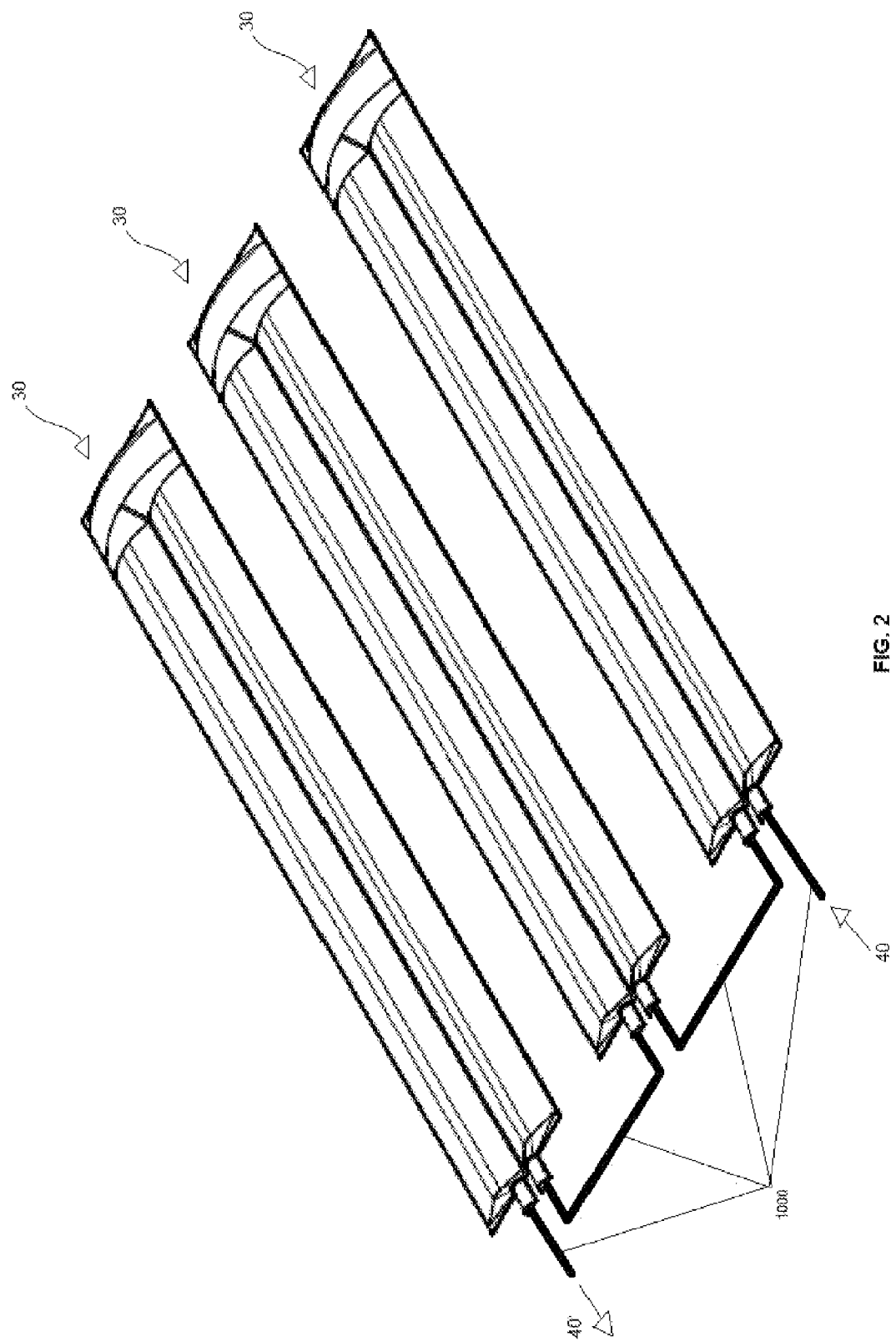
FIG. 2 is a top isometric view of example solar collectors connected in series according to various example embodiments.

Except where otherwise stated, the example solar collectors illustrated herein are shown in the inflated condition to facilitate clarity. It is understood that when deflated, the solar collectors may be substantially flat as described herein.

DETAILED DESCRIPTION

Following is a non-limiting written description of example embodiments illustrating various aspects of the invention. These examples are provided to enable a person of ordinary skill in the art to practice the full scope of the invention without having to engage in an undue amount of experimentation. As will be apparent to persons skilled in the art, further modifications and adaptations can be made without departing from the spirit and scope of the invention, which is limited only by the claims.

Turning first to FIGS. 1 and 1A, the sun or other radiative heat source 10 radiates heat energy 20 that impinges on and heats an example solar collector 30, which thereby heats air or other gaseous or fluid medium 40 that flows into the solar collector 30 at intake 50, and flows within a first collection tube 60 from a proximal end 32 to a distal end 34 on a first side 36, and flows through a junction 70 into a second collection tube 80 on a second side 38, then flowing from the distal end 34 back to the proximate end 32, and out through the exhaust 90, where the air or other gaseous or fluid medium 40 has thereby been heated, as represented by 40'. As illustrated in FIG. 1A, a portion of the radiant heat energy 20 travels through outer layer 5 of tubes 60, 80 where it impacts and heats any or all of optional layers 1, 2, 3, and 4, which are further described herein. The same dynamic occurs in junction(s) 70 when they are constructed, of layers like tubes 60, 80. The air 40 traveling through tubes 60, 80 and junction 70 is heated by any or all of layers 1, 2, 3, and 4, which have been heated by radiant energy 20, as well as by radiant energy 20 itself.

Figure 4:
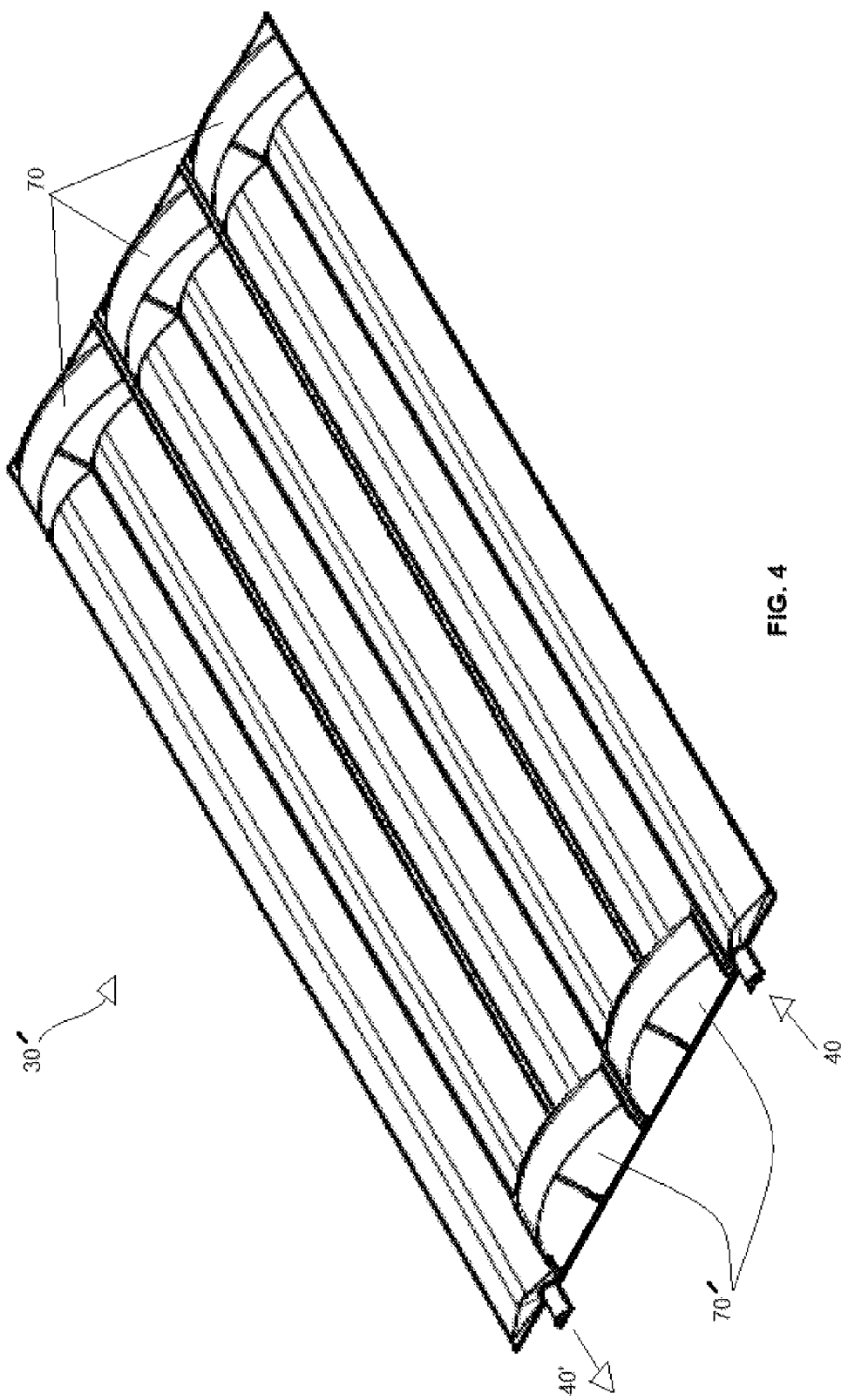
FIG. 4 is a top isometric view of a second example solar collector according to various example embodiments.
Figure 5:
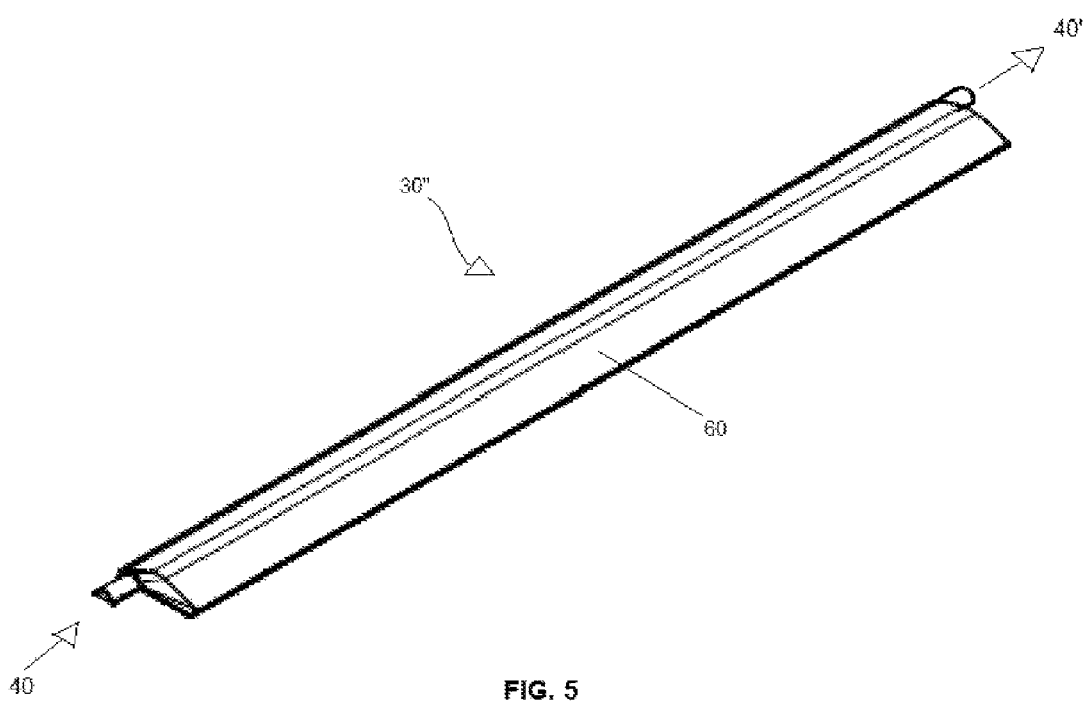
FIG. 5 is a top isometric view of a third example solar collector according to various example embodiments.
Figure 6:
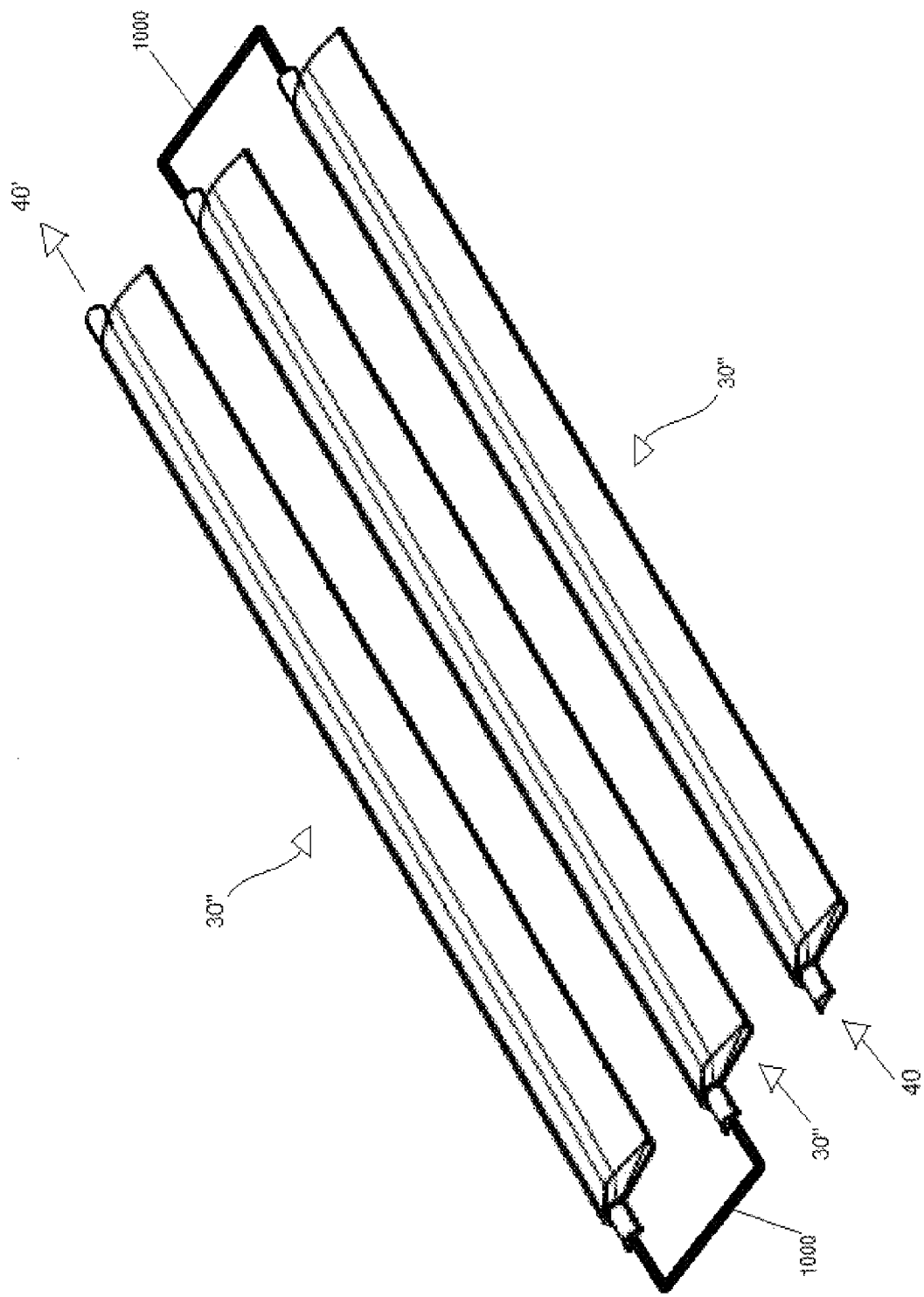
FIG. 6 is a top isometric view of three example solar collectors of FIG. 5 connected in series according to various example embodiments

In various example embodiments any other numbers of tubes and junctions may be provided. For instance, as shown in the examples illustrated in FIGS. 2, 3, 4, 5, and 6, a plurality of solar collectors 30 may be plumbed in series (FIG. 2), and/or in parallel (FIG. 3). Additionally, as shown in FIG. 4, other example embodiments of solar collectors 30' may individually comprise any number of tubes 60, 80, connected alternately by distal junctions 70 and proximate junctions 70'. In other example, embodiments a solar collector 30" may comprise a single tube 60, as shown in FIG. 5, which may, or may not be plumbed with other solar collectors 30''', for instance as shown in FIG. 6. In general, linking solar collectors 30 in series may raise the temperature of the air produced at exhaust 90, and may be limited by the temperature capabilities of the materials used to build the solar collectors 30. Alternatively, linking solar collectors 30 in parallel may generally raise the airflow capability of the resulting system and the heat energy produced by the resulting system without unduly raising the temperature of the air produced at exhaust(s) 90.

Figure 7:
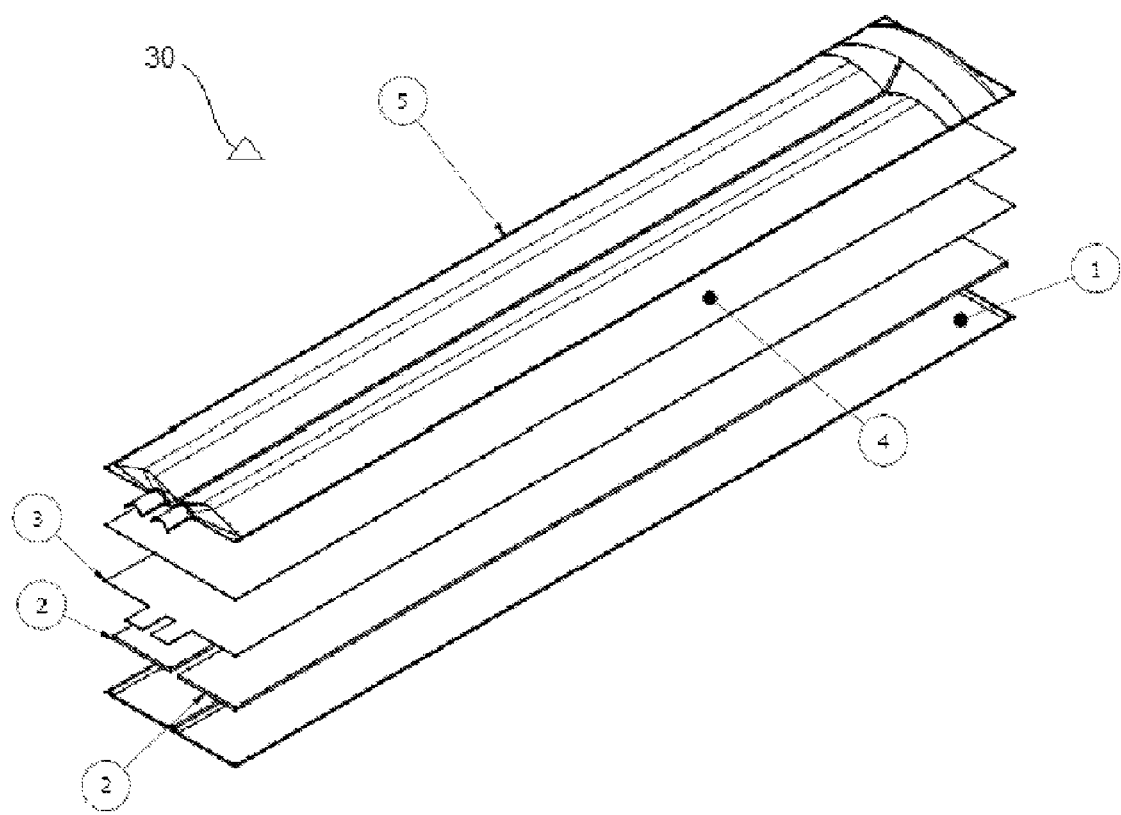
FIG. 7 is an exploded assembly view of the example solar collector of FIG. 1, showing example layers.

As shown in FIG. 7, the solar collectors 30, 30', 30", etc. (referred to collectively as solar collectors 30), in various example embodiments may comprise a lowest layer 1, for instance formed of black polyethylene plastic, black vinyl-coated polyester, or any other preferably inexpensive and flexible material suitable for the purposes herein. Any other type of material may be used for layer 1 as will be suitable for the purposes herein, preferably lightweight, thin, inexpensive, flexible, tough, tear-resistant, air-tight, waterproof and/or weather resistant material.

Above lowest layer 1 may be provided an insulative layer 2, for instance radiant reflective insulation such as Prodex™ brand insulation, which comprises reflective aluminum foil on each side of a 5 millimeter thick closed-cell polyethylene foam center. Any other type of insulating material may he used for layer 2 as will be suitable for the purposes herein, preferably lightweight, thin, and flexible insulating material that provides insulation against both conductive and radiant heat transfer. Alternatively, no insulating material may be used. In other embodiments an insulative material may be provided that includes an outer surface that is suitable to simultaneously act as both layer 1 and layer 2, in which case a separate layer 1 may be replaced with a dual-functioning layer 2.

Above the insulative layer 2, if any, is provided a dark colored or otherwise solar-energy-absorbant material 3, such as black polyethylene plastic, black vinyl-coated polyester, or any other suitable material that tends to absorb radiant heat energy. Any other type of material may be used for layer 3 as will be suitable for the purposes herein, preferably lightweight, thin, inexpensive, flexible material that tends to absorb radiant heat energy. In other embodiments, a material may be provided for layer 3 that includes an outer surface that is suitable to simultaneously act as layer 1, in which case separate layer 1 may be omitted. In still other embodiments, a material may be provided for layer 3 that provides insulative properties and includes an outer surface that is suitable to simultaneously act as layer 1, in which case separate layers 1 and 2 may be omitted.

With continuing reference to the example shown in FIG. 7, above the dark colored or otherwise solar-energy-absorbant material 3 may be provided a dark-colored or otherwise solar-energy-absorbant air-permeable layer 4 into the collection tube(s). Providing one or more perforated, rough surface, irregular surface, or other solar-energy-absorbent air-permeable layers 4 into the collection tube(s) tends to increase heating of the air 40 flowing through the collection tubes 60, 80 and junctions 70 by providing additional material to absorb solar energy 20 and by tending to create boundary layer turbulence in the flowing air 40. By way of example and not limitation, black fiberglass window screen may be used for layer 4, if any. Any other type of material may be used for solar-energy-absorbant air-permeable layer 4 as will be suitable for the purposes herein, preferably lightweight, thin, inexpensive, flexible material that absorbs solar energy and provides favorable boundary layer properties in the flowing air 40 as well as allows air communication with layer 3.

On top of the foregoing layers may be attached one or more layers of a clear or substantially translucent material 5, such as clear vinyl. Any other type of material may be used for layer 5 as will be suitable for the purposes herein, preferably lightweight, thin, inexpensive, flexible, tough, tear resistant, air-tight, waterproof and/or weather resistant material that is substantially translucent to radiant energy 20 and which may be readily affixed to layer 1 and/or the other layers to produce a substantially air-tight seal.

Figure 8:
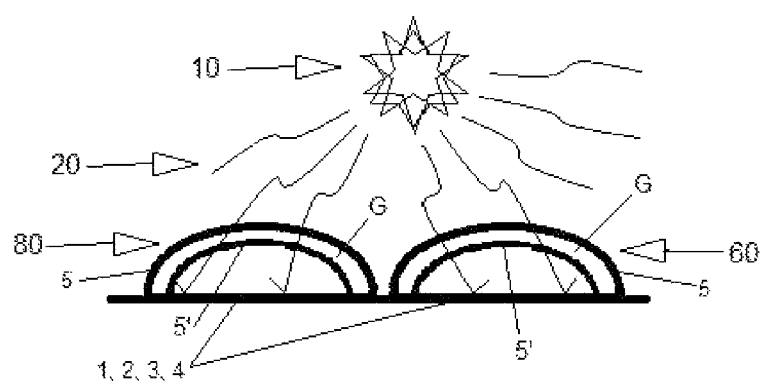
FIG. 8 is a sectional view of the example solar collector of FIG. 1 through section line A-A, shown with a sixth layer according to various example embodiments.

Tubes 60, 80, etc., may be formed by attaching layer 5 to one or more of the lower layers 1, 2, 3 and/or 4 along edges, e.g. 32, 34, 35, 36, 38, as shown in FIG. 1. The resulting openings or cavities defined between the dark colored or otherwise solar-energy-absorbant materials 3, 4 and clear or substantially translucent material layer(s) 5 defines collection tube 60, junction 70, collection tube 80, and subsequent tubes and junctions. Collection tube 60, junction 70, collection tube 80, and all subsequent tubes and junctions are adapted to be inflated and flow air 40 therethrough when pressurized air is introduced through intake 50. FIG. 8 depicts a variant of solar collector 30 shown in FIG. 1A, provided with a plurality of translucent material layers 5, 5' that may be provided proximate each other with an air gap G there between to act as an insulative layer against conductive heat loss from inside the tubes 60, 70.

The various optional layers 1, 2, 3, 4 and 5 may be joined together by any suitable means, such as sonic or heat welding, chemical or mechanical bonding, sewing, or any other preferably inexpensive and simple substantially air-tight means. Additional, different, or fewer layers may be employed without departing from the scope of the invention, and any number of tubes and junctions 60, 70, 80 may be formed in any combination of shapes, sizes, and geometries without departing from the scope of the invention.

As indicated in FIGS. 1 and 1A, the solar collector 30 may include through holes D in the seams along the edges 32, 34, 36, 38 of the collection tubes 60, 80 for use as attachment means to attach the collector 30 to a surface, such as the ground, a wall, or a roof. Grommets or other strengthening means (not shown) may be provided in connection with holes D. Any other suitable attachment means may be provided in addition to or instead of holes D, such as tabs, clips, loops, suction cups, magnets (for instance for use with metal roofs) or any other suitable mechanical fastening structure or portion thereof.

Also as indicated in FIGS. 1 and 1A, through holes or perforations D may be provided in the seams 35 between the collection tubes 60, 80 to allow rainwater or other moisture to drain out from between the collection tubes 60, 80. It bears repeating that while in the example embodiments presently shown only two collection tubes 60, 80 are used, any number of collection tubes may be used in other embodiments, including one, three, four, five, ten, twenty, one hundred, one thousand, etc., as will be apparent to one of skill in the art upon reviewing this disclosure.

Figure 9:
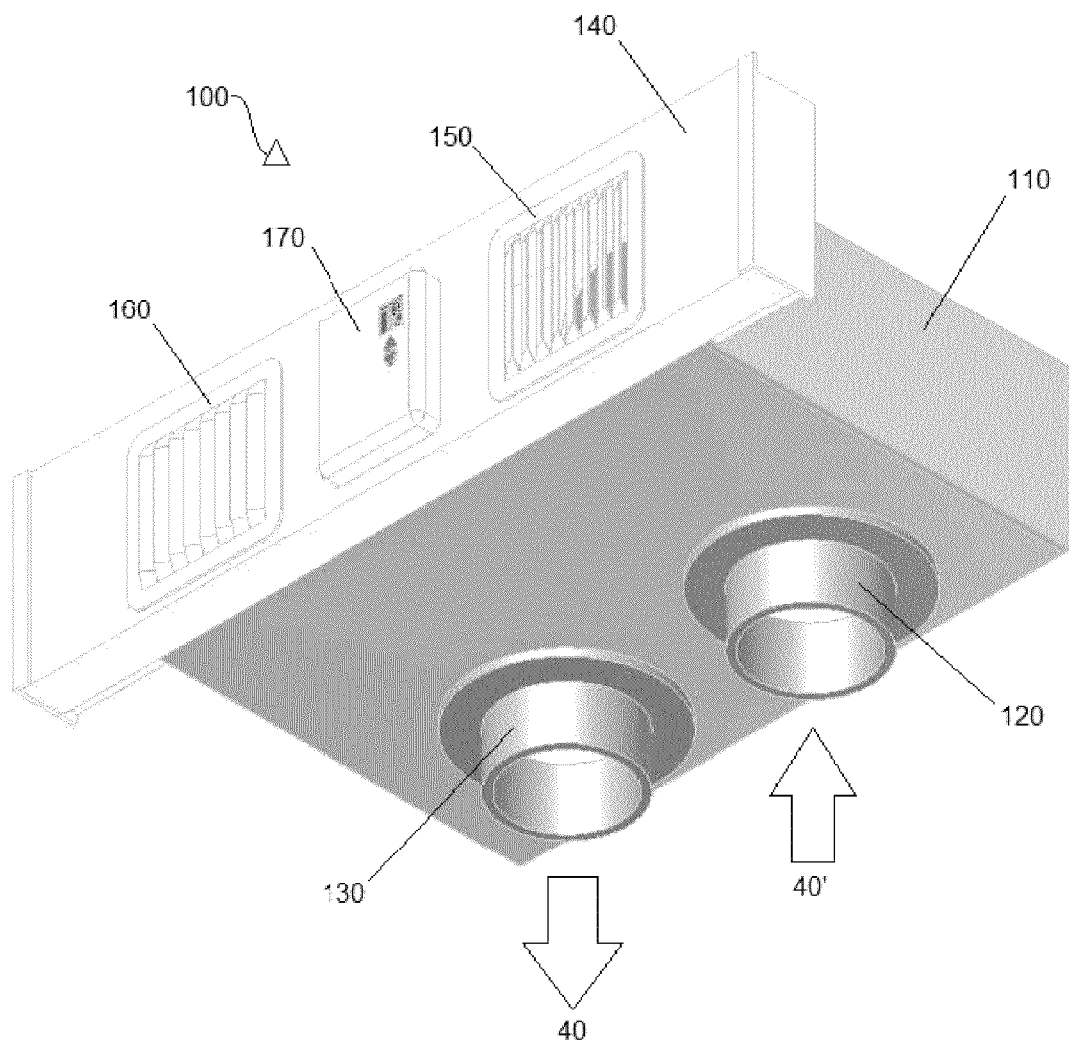
FIG. 9 is a bottom perspective view of a heating control system, adapted to be connected with the present solar collectors according to various example embodiments.

FIG. 9 shows an example stand-alone heating control system 100 that is adapted to work with the present solar collectors 30. In various example embodiments the heating control system 100 may include a housing 110 having one or more air input(s) 120 from the solar collector(s) 30 and one or more air output(s) 130 to the solar collector(s) 30, one or more air output register(s) 150 (hot air registers) that flow heated air 40' from the system 100 into the room or space where the heating system 100 is placed, and an air return register 160 (cool air return) that flows room temperature air 40 from the room or space where the heating system 100 is placed back into the solar collector 30. For example, a powered fan may be located within the housing 110 that sucks air through the air return 160, pressurizes the air 40 and forces it through output 130, through ducting 1000, and into the intake port 50 of solar collector 30, thereby pressurizing and at least partially inflating the collection tubes 60, 80 and junctions 70 and causing the air 40 to flow through the solar collector 30 where it becomes heated air 40', exits the exhaust port 90, passes through ducting 1000 into the input 120, and out the hot air register 150.

The stand-alone heating control system 100 may include a thermostat 170 and other electronics that control the fan, for instance to turn the system on and off at certain predetermined ambient temperatures that may be set by a user. In certain example embodiments the fan may comprise a TD-Mixvent™ Series, Model TD-100, TD-150, for instance, and the thermostat 170 may comprise a LUXPRO™ Model PSD010B thermostat, for example. Other electronics may include, for example, two 24V AC contact relays and one 24V AC transformer. A Snap Disk thermostat switch may also be provided inside the collector, such as a Model SE-F100 Snap Disk available from Selco Products Company. The stand-alone heating control system 100 may be adapted and sized to fit into a typical window of a home, and thus become a "window unit" heater, analogous to a window-unit airconditioner.

Figure 3:
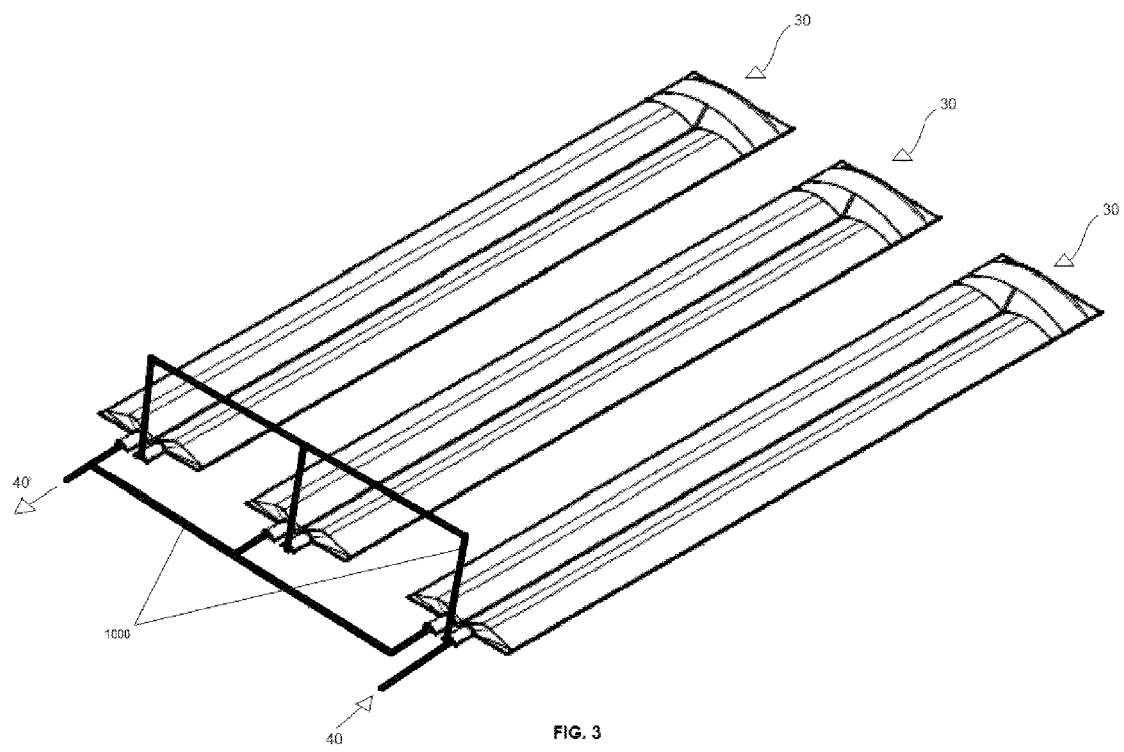
FIG. 3 is a top isometric view of example solar collectors connected in parallel according to various example embodiments.

Air duct hoses 1000, shown in part in FIGS. 2, 3, and 6, may be provided that connect the output(s) 90 of the solar collector(s) 30 to the input(s) 120 of the heating control system 100, and that connect the output(s) 130 of the heating control system 100 to the input(s) 50 of the solar collector 30. Duct hoses 1000 may be made from any suitable material, including a dark colored, or otherwise solar-energy-absorbent material 3, such as black polyethylene plastic, black vinyl-coated polyester, or any other suitable material, such as conventional flexible insulated HVAC ducting. The duct hoses 1000 may be insulated in any manner, for instance by being formed from a stack of layers of any or all of the materials 1, 2, 3, 4, and 5 as described with respect to FIG. 7. Air duct hoses 1000 in certain embodiments may form a heat exchanger comprising two adjacent hoses 1000 relatively uninsulated with respect to each other, but collectively surrounded by an insulating layer, for instance to exchange heat from heated air 40' to unheated air 40 to pre-heat the air 40 before it enters, the solar collector(s) 30. Pre-formed, rigid sections of air duct hoses 1000 may be provided in certain embodiments, and, may take any suitable form and may be made from any suitable material, such as metal and/or plastic. Alternatively or additionally, any other suitable air transmission means may be provided in addition to or in place of air duct hoses 1000, such as any form of conventional ductwork or manifold system(s).

When deflated, e.g., prior to use or after use, the solar collector 30 may in certain embodiments be as thin as a few millimeters in total thickness or vertical height, such as less than 10 millimeters, or in some cases, less than 9, 8, 7, 6, or 5 millimeters. In one example embodiment, a solar collector 30 may have two collection tubes 60, 80 and one junction 70, together defining an overall longitudinal outer dimension or length of approximately 24 feet from a proximal end 32 to a distal end 34, and an overall latitudinal outer dimension or width of approximately 4 feet from a first side 36 to a second side 38. In this particular embodiment, a single individual can readily roll the solar collector 30 into a coil about 18 inches in diameter, approximately the size of a rolled-up sleeping bag, when not in use. And such an embodiment can of a solar collector 30 can weigh less than 50 pounds, and in some embodiments less than 35 pounds, so that a single individual user can readily lift it, carry it and store it.

A single individual can likewise reverse the process by carrying the rolled-up solar collector 30 to an appropriately sunny area, laying it on the ground or other substantially flat surface such as a sidewalk, driveway, or roof, or attaching it to a steeply angled or vertical surface such as a wall, and then unrolling it with layer 5 facing the sun. Then the intake 50 can be attached with a source of pressurized air, for instance by connecting the intake 50 with ducting 1000 to output 130 of heating control system 100. The exhaust 90 may then be directed to an area where heated air is desired. For example, the exhaust 90 may be directed into the interior of a structure, such as a home or business. For instance, exhaust 90 may be connected by ducting 1000 to input 120 of heating control system 100, where the heating control system 100 is located at least partially inside the structure, for instance when heating control system 100 is mounted in a window opening. A simple installation of such a unit on the ground may take less than an hour, and less than fifteen minutes for an experienced user. Such a unit can also be mounted on roofs and sides of buildings with very minor preparation.

Once assembled, the sun 10 or other source of radiant energy 20 then transmits energy onto solar collector 30, a substantial part of which travels through the clear or substantially translucent material 5 and impacts and is at partially absorbed by the dark colored or otherwise solar-energy-absorbent materials 3, 4, which are thereby heated to higher than ambient temperatures. Air 40 is then caused to flow through collection tube 60, junction 70, and collection tube 80, whereby heat is transferred from the dark colored or otherwise solar-energy-absorbent materials 3, 4 to the air 40, resulting in heated air 40' that is exhausted at exhaust 90, which may in certain example embodiments be transmitted through ducting 1000 to heating control system 100 or the like and into the structure to be heated. Using this particular example embodiment of a solar collector 30 (i.e., approximately 24 feet by 4 feet with two tubes 60, 80 connected by one junction 70) laying outdoors on the ground, in combination with a fan or other source of pressurized air, such as a 150 CFM to 500 CFM fan, can generate about 12000 to 15000 BTUs in full Winter sunlight in the Midwestern United States when it is only about 30 degrees Fahrenheit outside.

As will be apparent to persons of skill in the art upon reviewing this disclosure, any combination of any number of multiple solar collectors 30 and multiple heating control systems 100 or the like may be assembled in a given installation, either separately and/or connected together in series and/or parallel, for instance as shown in FIGS. 2, 3 and 6. Other modifications and adaptations to the above-described example embodiments of the invention can be made as will be apparent to persons skilled in the art, without departing from the spirit and scope of the invention, which is defined only by the claims.

What is claimed is:

1. A flexible, inflatable, longitudinally extending solar collector that is substantially flat and readily capable of being compressed to less than ten millimeters thick when uninflated, comprising:

a first layer formed of flexible, tear-resistant, substantially air-tight and waterproof plastic;

a second layer on top of and substantially covering the first layer and comprising flexible insulating material reflective of radiant energy, wherein the second layer comprises reflective aluminum foil on each side of a closed-cell polyethylene foam center;

a third layer on top of and substantially covering the second layer and comprising flexible material absorbent of solar energy;

a fourth layer on top of and substantially covering the third layer and comprising flexible material absorbent of solar energy, the fourth layer being air-permeable;

a fifth layer on top of and substantially covering the first, second, third, and fourth layers and comprising flexible, tear-resistant, substantially air-tight and waterproof plastic material substantially translucent to solar radiation;

wherein at least the first and fifth layers are affixed together by a plurality of longitudinally extending seams forming there between a substantially air-tight heating chamber below the fifth layer, the substantially air-tight heating chamber comprising at least one of an air intake port, an air exhaust port, or one or more junctions constructed to be in air communication with another heating chamber in another solar collector; and wherein the solar collector is constructed to heat pressurized air when it is passed into the air intake port, through the heating chamber below the fifth layer, and out the air exhaust port or junction, when the solar collector is placed in sunlight with the fifth layer facing the sun.

2. The solar collector of claim 1, wherein at least the first and fifth layers are affixed together by a plurality of longitudinally extending seams forming there between a plurality of substantially air-tight heating chambers below the fifth layer, the substantially air-tight heating chambers in air communication with each other through a junction;

wherein the solar collector is constructed to heat pressurized air when it is passed into the air intake port, through a first heating chamber below the fifth layer, through a junction, through a second heating chamber below the fifth layer, and out the air exhaust port, when the solar collector is placed in sunlight with the fifth layer facing the sun.

3. The solar collector of claim 1, further comprising a sixth layer on top of and substantially covering the fifth layer and comprising flexible, tear-resistant, substantially air-tight and waterproof plastic material substantially translucent to solar radiation;

wherein the fifth and sixth layers are affixed together by a plurality of longitudinally extending seams forming there between a substantially air-tight insulating chamber between the fifth and sixth layers.

4. The solar collector of claim 1, wherein the first layer comprises black polyethylene plastic.

5. The solar collector of claim 1, wherein the first layer comprises black vinyl-coated polyester.

6. The solar collector of claim 1, wherein the closed-cell polyethylene foam center of the second layer is 5 millimeters thick.

7. The solar collector of claim 1, wherein the third layer comprises black polyethylene plastic.

8. The solar collector of claim 1, wherein the third layer comprises black vinyl-coated polyester.

9. The solar collector of claim 1, wherein the fourth layer comprises a perforated material having an unsmooth surface constructed to generate boundary layer turbulence in air moving across the surface.

10. The solar collector of claim 1, wherein the fourth layer comprises black fiberglass screen material.

11. The solar collector of claim 1, wherein the fifth layer comprises clear vinyl.

12. The solar collector of claim 1, wherein at least a portion of the longitudinally extending seams are at least one of the following: sonically welded; heat welded; chemically bonded; mechanically bonded; sewn.

13. The solar collector of claim 1, wherein said solar collector is connected with a plurality of other said solar collectors such that the air exhaust port of a first solar collector is in air communication with the air intake port of a second solar collector.

14. The solar collector of claim 1, wherein said solar collector is connected with a plurality of other said solar collectors such that the air exhaust port of a first solar collector is not in air communication with the air intake port of a second solar collector, and wherein the air intake ports of the first and second solar collectors are in air communication with each other and the air exhaust ports of the first and second solar collectors are in air communication with each other.

15. A solar collector system, comprising:

A flexible, inflatable, longitudinally extending solar collector that is substantially flat and readily capable of being compressed to less than ten millimeters thick when uninflated, comprising:

a first layer formed of flexible, tear-resistant, substantially air-tight and waterproof plastic;

a second layer on top of and substantially covering the first layer and comprising flexible insulating material reflective of radiant energy, wherein the second layer comprises reflective aluminum foil on each side of a closed-cell polyethylene foam center;

a third layer on top of and substantially covering the second layer and comprising flexible material absorbent of solar energy;

a fourth layer on top of and substantially covering the third layer and comprising flexible material absorbent of solar energy, the fourth layer being air-permeable;

a fifth layer on top of and substantially covering the first, second, third, and fourth layers and comprising flexible, tear-resistant, substantially air-tight and waterproof plastic material substantially translucent to solar radiation;

wherein at least the first and fifth layers are affixed together by a plurality of longitudinally extending seams forming there between a substantially air-tight heating chamber below the fifth layer, the substantially air-tight heating chamber comprising at least one of an air intake port, an air exhaust port, or one or more junctions constructed to be in air communication with another heating chamber in another solar collector; and wherein the solar collector is constructed to heat pressurized air when it is passed into the air intake port, through the heating chamber below the fifth layer, and out the air exhaust port or junction, when the solar collector is placed in sunlight with the fifth layer facing the sun;

a heating control system comprising a housing defining one or more air inputs in communication with one or more hot air registers, and one or more cool air return registers in air communication with an air pressurizer, the air pressurizer in pressurized air communication with one or more air outputs;

first ducting constructed to connect at least one of the air outputs of the heating control system to the air intake port of the solar collector; and second ducting constructed to connect the air exhaust port of the solar collector to at least one of the air inputs of the heating control system;

wherein the solar collector system is constructed to cause air to flow into the cool air return register, be pressurized by the air pressurizer, flow out at least one of the air outputs. through the first ducting, into the intake port of the solar collector, through the heating chamber in the solar collector, thereby inflating it, out the air exhaust port of the solar collector, through the second ducting, into at least one of the air inputs, and out of at least one of the hot air registers.

16. The solar collector system of claim 15, wherein the heating control system housing is adapted to be removably lodged in an at least partially open window of a building such that the one or more hot air registers and one or more cool air return registers are directed toward the interior of the building, and the one or more air inputs and one or more air outputs are directed outside the building.

17. The solar collector system of claim 15, wherein the air pressurizer is controlled by one or more thermostats that monitor the temperature of the air being delivered to the heating control system from inside the building and the temperature of the air being delivered to the heating control system by the solar collector.

18. The solar collector system of claim 15, wherein at least one of he first and second ducting comprises flexible duct hose.

19. A method of using a solar collector system, comprising the steps of:
- providing a solar collector system, comprising:
  - a flexible, inflatable, longitudinally extending solar collector that is substantially flat and readily capable of being compressed to less than ten millimeters thick when uninflated, comprising:
    - a first layer formed of flexible, tear-resistant, substantially air-tight and waterproof plastic;
    - a second layer on top of and substantially covering the first layer and comprising flexible insulating material to reflective of radiant energy, wherein the second layer comprises reflective aluminum foil on each side of a closed-cell polyethylene foam center;
    - a third layer on top of and substantially covering the second layer and comprising flexible material absorbent of solar energy;
    - a fourth layer on top of and substantially covering the third layer and comprising flexible material absorbent of solar energy, the fourth layer being air-permeable;
    - a fifth layer on top of and substantially covering the first, second, third, and fourth layers and comprising flexible, tear-resistant, substantially air-tight and waterproof plastic material substantially translucent to solar radiation;
    - wherein at least the first and, fifth layers are affixed together by a plurality of longitudinally extending seams forming, there between a substantially air-tight heating chamber below the fifth layer, the substantially air-tight heating chamber comprising at least one of an air intake port, an air exhaust port, or one or more junctions constructed to be in air communication with another heating, chamber in another solar collector; and
    - wherein the solar collector is constructed to heat pressurized air when it is passed into the air intake port, through the heating chamber below the fifth layer, and out the air exhaust port or junction, when the solar collector is placed in sunlight with the fifth layer facing the sun:
  - a heating control system comprising a housing defining one or more air inputs in communication with one or more hot air registers, and one or more cool air return registers in air communication with an air pressurizer, the air pressurizer in pressurized air communication with one or more air outputs;
  - first ducting constructed to connect at least one of the air outputs of the heating control system to the air intake port of the solar collector; and
  - second ducting constructed to connect the air exhaust port of the solar collector to at least one of the air inputs of the heating, control system;
  - wherein the solar collector system is constructed to cause air to flow into the cool air return register, be pressurized by the air pressurizer. flow out at least one of the air outputs, through the first ducting, into the intake port of the solar collector, through the heating chamber in the solar collector, thereby inflating it, out the air exhaust port of the solar collector, through the second ducting, into at least one of the air inputs, and out of at least one of the hot air registers;
- removably lodging the housing of the heating control system into an at least partially open window of a building such that the one or more hot air registers and one or more cool air return registers are directed toward the interior of the building, and the one or more air inputs and one or more air outputs are directed outside the building;
- placing the solar collector in sunlight with the fifth layer facing the sun and the fifth layer positioned between the sun and the second layer;
- connecting at least one of the air outputs of the heating control system to the air intake port of the solar collector with the first ducting;
- connecting the air exhaust port of the solar collector to at least one of the air inputs of the heating control system with the second ducting; and
- causing air to flow into the cool air return register, be pressurized by the air pressurizer, flow out at least one of the air outputs, through the first ducting, into the intake port of the solar collector, through the heating chamber in the solar collector, thereby inflating it, out the air exhaust port of the solar collector, through the second ducting, into at least one of the air inputs, and out of at least one of the hot air registers.

20. The method of using a solar collector system of claim 19, further comprising the steps of
- disconnecting the first and second ducting from the solar collector;
- deflating the solar collector;
- rolling the solar collector into a coil; and
- picking up and moving the coiled solar collector with one's arms.

* * * * *